US012043142B2

(12) United States Patent
Zhao et al.

(10) Patent No.: US 12,043,142 B2
(45) Date of Patent: Jul. 23, 2024

(54) SPRING LOADED GEARBOX FOR POWER LONG RAIL ASSEMBLY

(71) Applicant: Magna Seating Inc, Aurora (CA)

(72) Inventors: Kai Zhao, Novi, MI (US); Detjon Marini, White Lake, MI (US); Avery Folk, West Bloomfield, MI (US); Kristof M Kurzeja, Commerce Township, MI (US)

(73) Assignee: Magna Seating Inc., Aurora (CA)

( * ) Notice: Subject to any disclaimer, the term of this patent is extended or adjusted under 35 U.S.C. 154(b) by 108 days.

(21) Appl. No.: 17/759,862

(22) PCT Filed: Feb. 1, 2021

(86) PCT No.: PCT/US2021/015989
§ 371 (c)(1),
(2) Date: Aug. 1, 2022

(87) PCT Pub. No.: WO2021/155338
PCT Pub. Date: Aug. 5, 2021

(65) Prior Publication Data
US 2023/0294564 A1   Sep. 21, 2023

Related U.S. Application Data

(60) Provisional application No. 62/968,392, filed on Jan. 31, 2020.

(51) Int. Cl.
*B60N 2/02* (2006.01)
*B60N 2/06* (2006.01)

(52) U.S. Cl.
CPC ............. *B60N 2/0224* (2013.01); *B60N 2/06* (2013.01)

(58) Field of Classification Search
CPC ............. B60N 2/0224; B60N 2/02246; B60N 2/02253; B60N 2/02258; B60N 2/06; B60N 2/067; B60N 2/1875
(Continued)

(56) References Cited

U.S. PATENT DOCUMENTS 5,094,420 A * 3/1992 Aihara ............... B60N 2/02246
248/419
5,323,998 A * 6/1994 Aihara ................... B60N 2/067
248/419
(Continued)

FOREIGN PATENT DOCUMENTS

EP        0359008      3/1990
WO     2020077209      4/2020

*Primary Examiner* — Jonathan Liu
*Assistant Examiner* — Guang H Guan
(74) *Attorney, Agent, or Firm* — Miller Canfield (57) ABSTRACT

A long rail assembly for use in an automotive vehicle includes a fixed long rail and a power rail drive assembly having a drive wheel for transposing the power rail drive assembly along the fixed long rail. The power rail drive assembly includes an upper channel, a spring-loaded gearbox assembly fixedly coupled to the upper channel, and the drive wheel fixedly coupled to a drive shaft projecting from the spring-loaded gearbox assembly and rotated by the spring-loaded gearbox assembly for transposing the power rail drive assembly along the fixed long rail. The spring-loaded gearbox assembly includes a mounting bracket fixedly coupled to the upper channel, a gearbox repositionable within the mounting bracket, and a spring biasing the gearbox within the mounting bracket such that the drive wheel is engaged with the fixed long rail.

13 Claims, 11 Drawing Sheets

(58) Field of Classification Search
USPC .......... 248/424, 429, 430; 296/65.13, 65.14, 296/65.15
See application file for complete search history.

(56) References Cited

U.S. PATENT DOCUMENTS

| | | | | |
|---|---|---|---|---|
| 5,481,941 | A * | 1/1996 | Premji | B60N 2/0875 297/375 |
| 5,732,923 | A * | 3/1998 | Tame | B60N 2/42781 248/430 |
| 5,826,936 | A * | 10/1998 | Scordato | B60N 2/072 297/259.1 |
| 6,260,672 | B1 * | 7/2001 | Frohnhaus | B60N 2/067 248/419 |
| 6,691,971 | B2 | 2/2004 | Yamada et al. | |
| 7,041,024 | B2 * | 5/2006 | Becker | F16H 37/041 475/162 |
| 8,844,891 | B2 | 9/2014 | Yamada et al. | |
| 9,421,891 | B2 * | 8/2016 | Andres | F16H 1/32 |
| 10,011,195 | B2 | 7/2018 | Kume et al. | |
| 10,759,311 | B2 * | 9/2020 | Petit | B60N 2/0881 |
| 10,857,910 | B2 * | 12/2020 | Madhu | B60N 2/02246 |
| 11,345,259 | B2 * | 5/2022 | Marini | B60N 2/43 |
| 11,498,459 | B2 * | 11/2022 | Petit | B60N 2/085 |
| 11,584,261 | B2 * | 2/2023 | Teer | F16H 19/043 |
| 11,597,303 | B2 * | 3/2023 | Zhao | B60N 2/01541 |
| 11,679,694 | B2 * | 6/2023 | Zhao | B60N 2/0875 248/429 |
| 11,760,233 | B2 * | 9/2023 | Napau | B60N 2/0825 296/65.15 |
| 11,794,613 | B2 * | 10/2023 | Zhao | B60N 2/0715 |
| 2018/0334054 | A1 | 11/2018 | Higuchi et al. | |
| 2019/0084453 | A1 | 3/2019 | Petit et al. | |
| 2021/0129710 | A1 * | 5/2021 | Petit | B60N 2/0818 |
| 2021/0370804 | A1 * | 12/2021 | Zhao | B60N 2/0875 |
| 2022/0017000 | A1 * | 1/2022 | Zhao | B60N 2/06 |
| 2022/0161691 | A1 * | 5/2022 | Zhao | B60N 2/07 |
| 2022/0219569 | A1 * | 7/2022 | Zhao | B60N 2/08 |
| 2023/0062149 | A1 * | 3/2023 | Zhao | B60N 2/01508 |
| 2023/0294564 | A1 * | 9/2023 | Zhao | B60N 2/06 248/429 |
| 2023/0391230 | A1 * | 12/2023 | Zhao | B60N 2/02253 |

* cited by examiner

SPRING LOADED GEARBOX FOR POWER LONG RAIL ASSEMBLY

CROSS-REFERENCE TO RELATED APPLICATIONS

This application claims priority to and all the benefits of U.S. Provisional Application 62/968,392, filed Jan. 31, 2020, and entitled "Spring Loaded Gearbox for Power Long Rail Assembly", the disclosure of which is hereby incorporated by reference in its entirety.

BACKGROUND OF THE INVENTION

1. Field of the Invention

The present invention relates to a long rail assembly wherein a vehicle seat with power adjustment capability is removably attached to the long rail assembly.

2. Description of Related Art

Many vehicles today have systems that give vehicle seats the capability of power adjustment. Certain vehicle systems include one or more fixed long rails attached to a vehicle floor and a power rail drive assembly configured to transpose a vehicle seat along the fixed long rail. Often, the vehicle seat is configured to be decoupled from the power rail drive assembly such that the vehicle seat can be removed from the vehicle and reattached to the power rail drive assembly as desired. Further, certain vehicle systems include a gear rack extending along the fixed long rail and a drive wheel attached to the power rail drive assembly and driven by a power source. The vehicle seat is transposed along the fixed long rail by rotation of the drive wheel along the gear rack in the fixed long rail. While the drive wheel is typically configured to meshingly engage with the gear rack, tolerance stack up, variation in the dimensions of the various components, vibration from road input, as well as impacts to the power rail drive assembly when the vehicle seat is decoupled/reattached to the power rail drive system, can affect the mesh engagement between the drive wheel and the gear rack.

Thus, it is desirable to have a vehicle seat positioning system with power adjustment capabilities that is less affected by variation in component dimensions. Further, it is desirable to maintain engagement between a drive wheel of a power rail drive assembly and a gear rack within a fixed long rail when the drive wheel is subjected to vibration from road input. Finally, it is desirable to incorporate a spring-loaded gearbox assembly within the power rail drive assembly that provides torque to the drive wheel and biases the drive wheel towards an engaged position with the gear rack.

SUMMARY OF THE INVENTION

The present invention relates to a long rail assembly for providing sliding movement of a vehicle seat within a vehicle. The long rail assembly includes a fixed long rail and a power rail drive assembly slidably coupled to the fixed long rail for providing the sliding movement of the vehicle seat along the fixed long rail. The power rail drive assembly includes an upper channel, a spring-loaded gearbox assembly fixedly coupled to the upper channel and a drive wheel fixedly coupled to a drive shaft projecting from the spring-loaded gearbox assembly and rotated by the spring-loaded gearbox assembly for transposing the power rail drive assembly along the fixed long rail. The spring-loaded gearbox assembly includes a mounting bracket fixedly coupled to the upper channel, a gearbox repositionable within the mounting bracket, and a spring biasing the gearbox within the mounting bracket such that the drive wheel is meshingly engaged with the fixed long rail.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-12 illustrate a long rail assembly 10 having a power rail drive assembly 12 configured to provide sliding adjustment of a vehicle seat 18 in an automotive vehicle according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
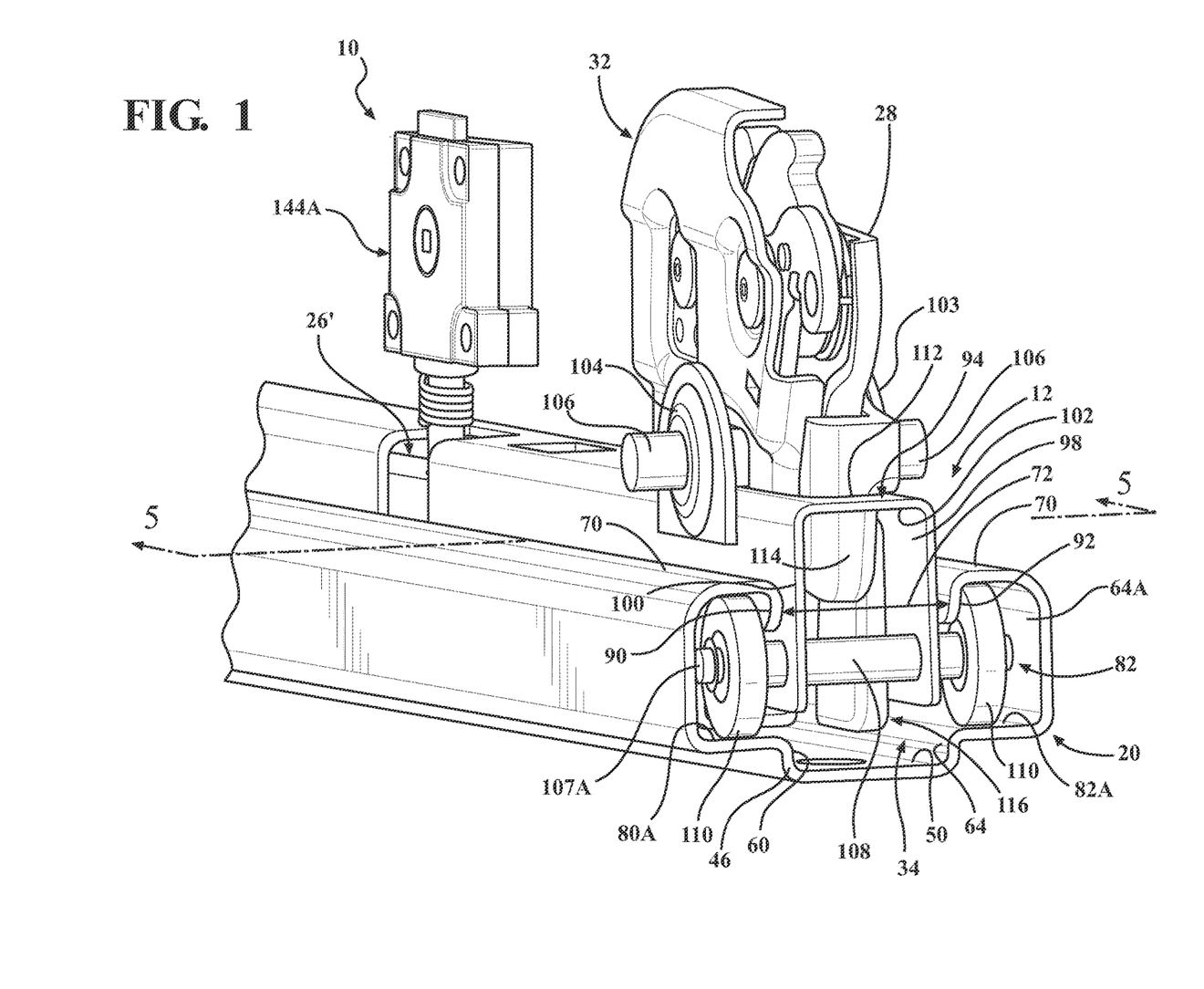
FIG. 1 is a fragmentary perspective view of a long rail assembly according to one embodiment of the invention.
Figure 2:
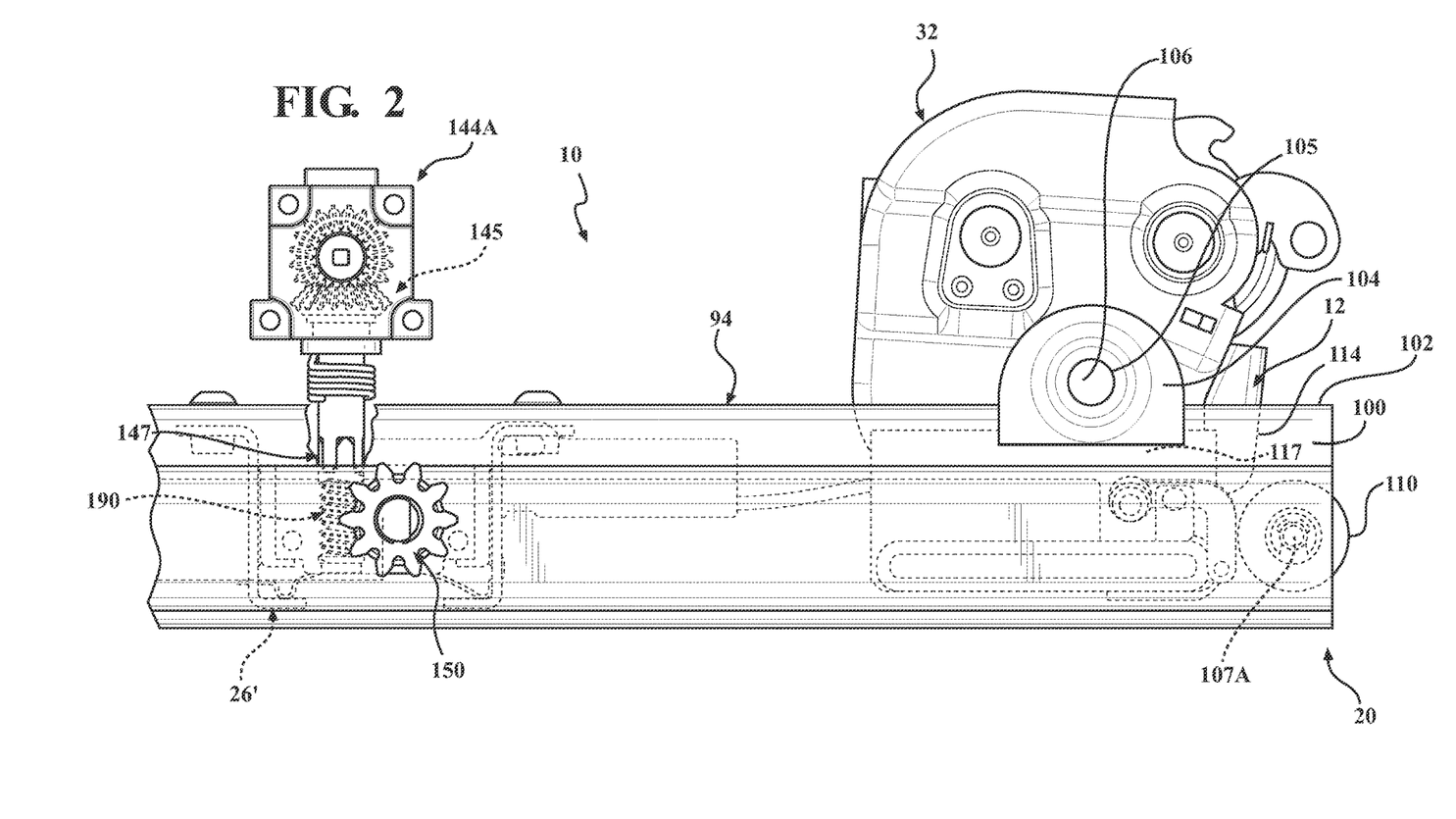
FIG. 2 is a partially transparent side view of the long rail assembly of FIG. 1.
Figure 3:
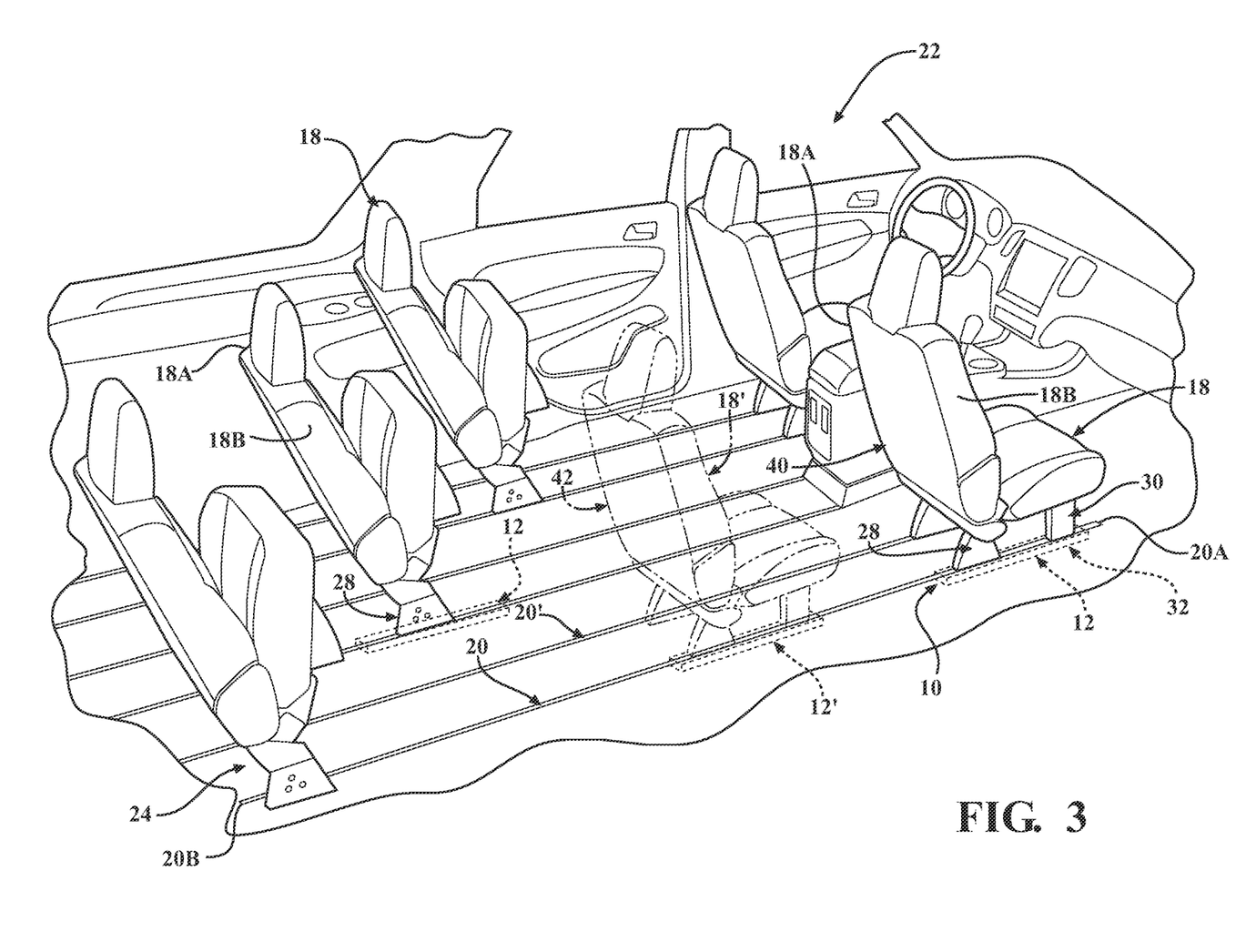
FIG. 3 is a fragmentary perspective view of a vehicle interior having a vehicle seat coupled to the long rail assembly of FIG. 1, according to one embodiment of the present invention.
Figure 4:
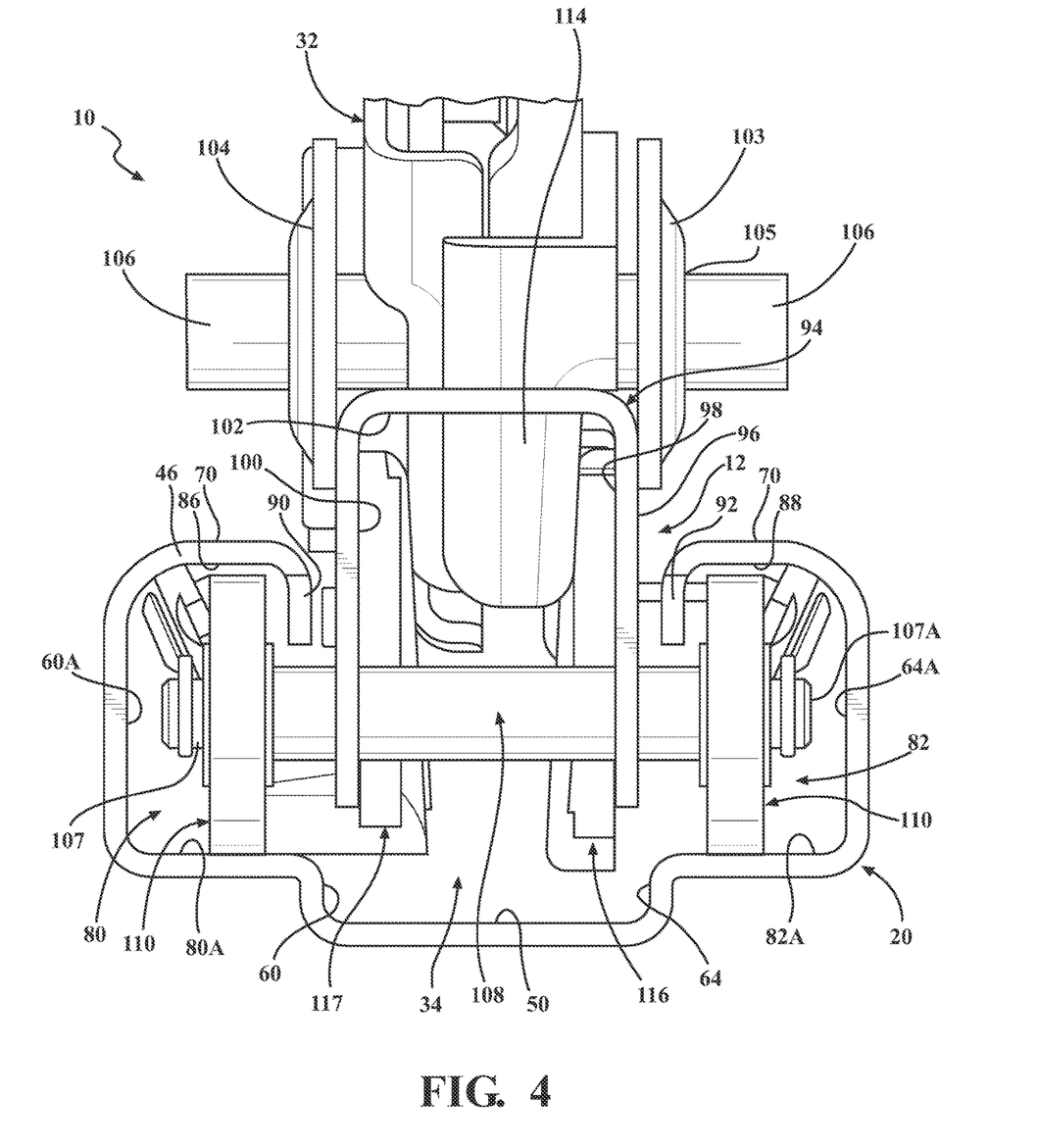
FIG. 4 is an end view of the long rail assembly of FIG. 1, illustrating a power rail drive assembly and a fixed long rail.
Figure 5:
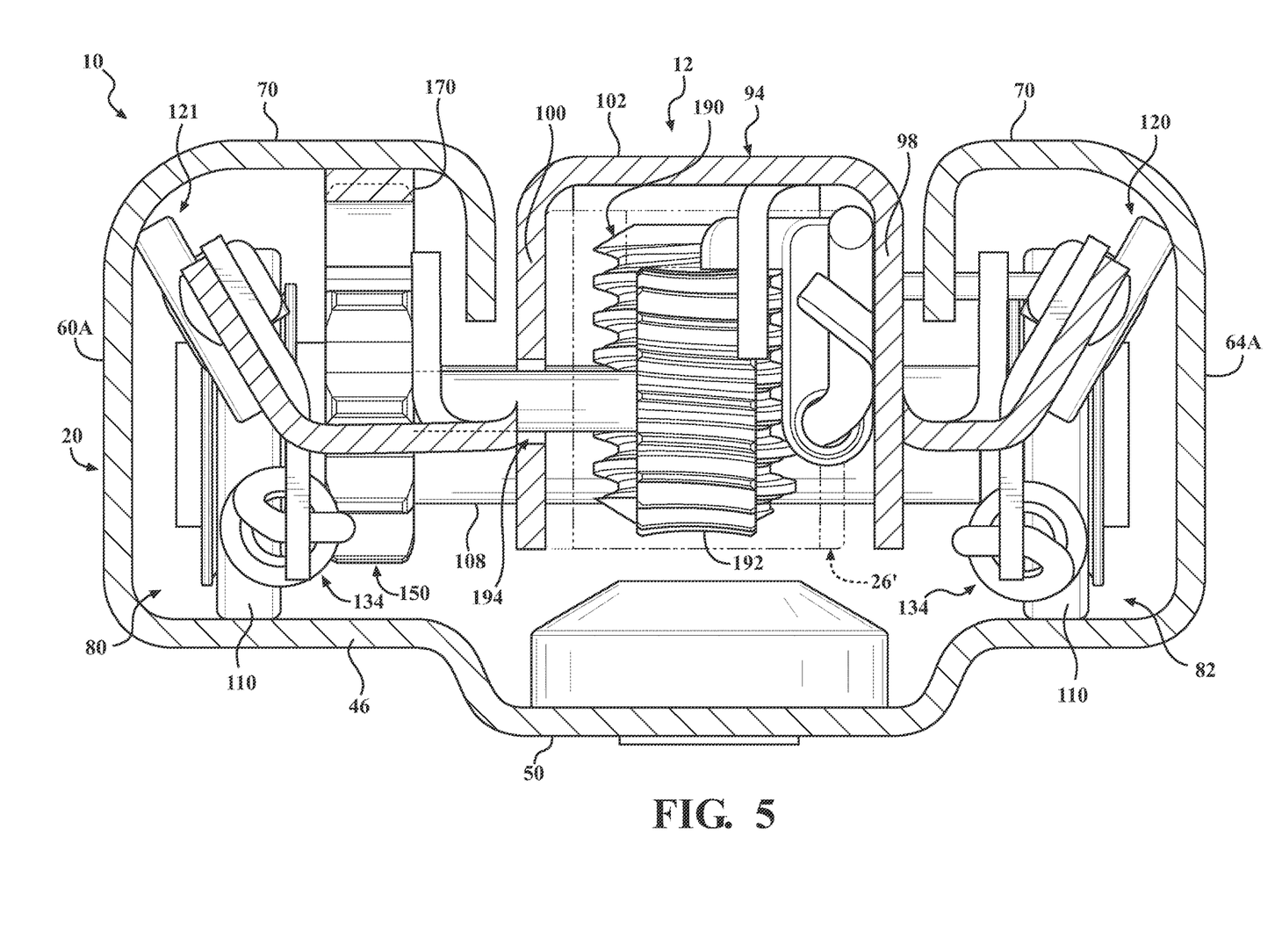
FIG. 5 is a cross-sectional view of the long rail assembly of FIG. 1 taken along section line 5-5, illustrating a spring-loaded gearbox assembly within the power rail drive assembly.
Figure 6:
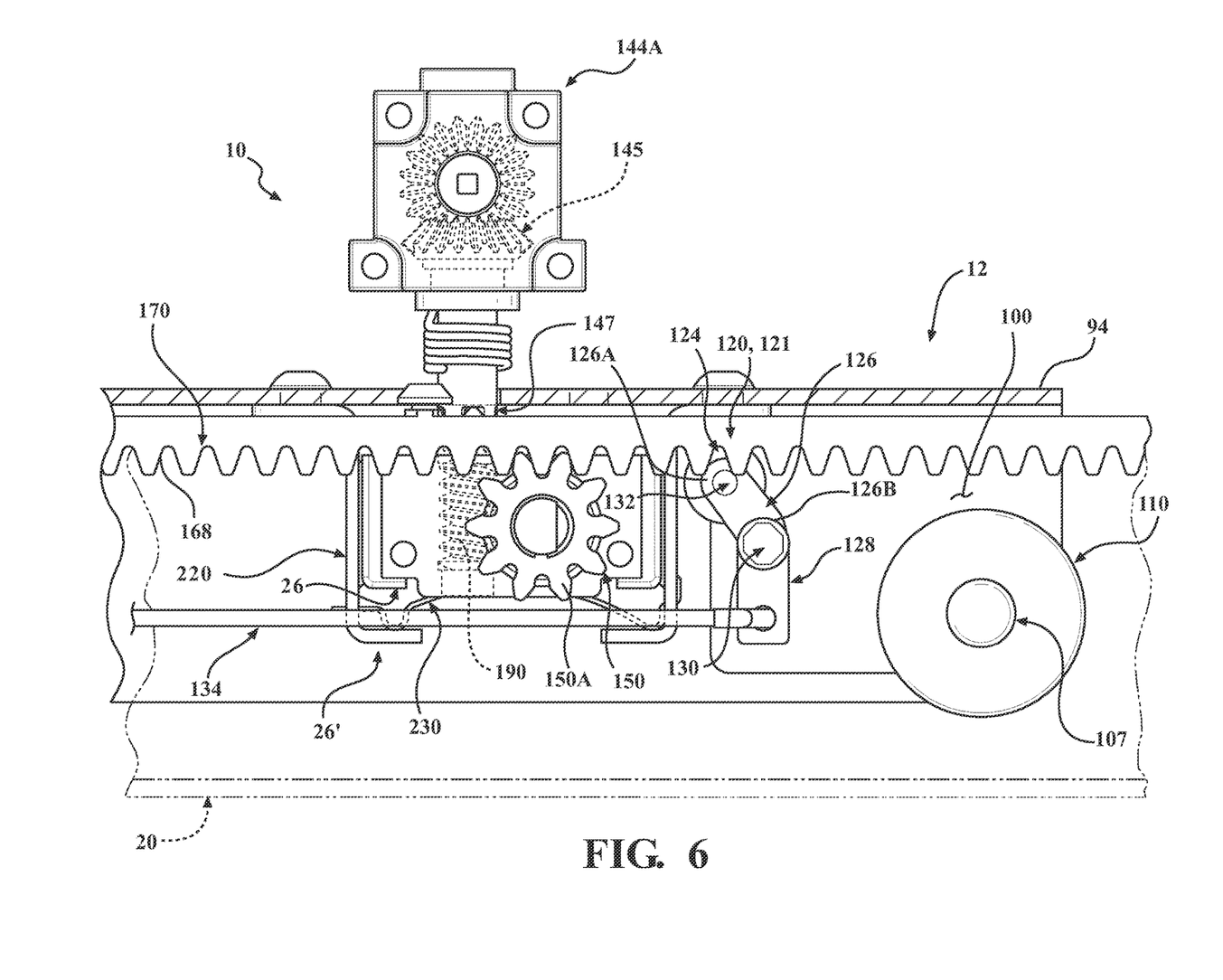
FIG. 6 is a cutaway side view of the portion of the long rail assembly of FIG. 1, illustrating the spring-loaded gearbox assembly within the power rail drive assembly, according to one embodiment of the present invention.

FIGS. 1-3 illustrate a long rail assembly 10 comprising a fixed long rail 20 and a power rail drive assembly 12 for adjusting the position of a vehicle seat 18 along the fixed long rail 20, according to one embodiment of the present invention. FIG. 3 shows an interior 22 of a vehicle having a plurality of vehicle seats 18 connected to power rail drive assemblies 12 configured to travel along respective fixed long rails 20 attached to a vehicle floor 24. An end view of the long rail assembly 10 of FIG. 1 is shown in FIG. 4, illustrating additional details of the power rail drive assembly 12. FIGS. 5 and 6 show a cross-sectional view and a cutaway partially transparent side view, respectively, of the long rail assembly 10 of FIG. 1, illustrating a spring-loaded gearbox assembly 26' within the power rail drive assembly 12.

Referring to FIG. 3, each vehicle seat 18 is supported by at least one leg 28, or optionally front and rear legs 30, 28, on opposing sides 18A, 18B of the vehicle seat 18. The vehicle seat 18 has at least one leg 28 attached to a latch assembly 32 for removably coupling the vehicle seat 18 to the power rail drive assembly 12. Each power rail drive assembly 12 travels along one of the fixed long rails 20 attached to the vehicle floor 24. Each fixed long rail 20 extends longitudinally between opposing first and second ends 20A, 20B of the fixed long rail 20 defining an interior cavity 34 (shown in FIG. 1) therebetween. In the embodiment shown in FIG. 3, each vehicle seat 18 travels along a pair of fixed long rails 20, 20' when the vehicle seat 18 is repositioned between a first seat location 40 and a second seat location 42, shown as the repositioned vehicle seat 18' removably coupled to the repositioned power rail drive assembly 12'. The long rail assembly 10 allows for improved vehicle seat 18 position adjustment since the vehicle seat 18 coupled to at least one power rail drive assembly 12 is repositionable to any seat location 40, 42 along the at least one fixed long rail 20. Furthermore, each vehicle seat 18 can be decoupled from the power rail drive assembly 12 allowing the number of vehicle seats 18 within the vehicle interior 22 to be adjusted or varied as desired.

Referring to FIG. 1, one embodiment of the fixed long rail 20 comprises a lower channel having a generally U-shaped cross-sectional profile 46 extending in a longitudinal direction, a bottom wall 50, opposing side walls 60, 64, and a top wall 70 having an elongated opening 72 extending in a longitudinal direction. Referring to FIG. 4, each side wall 60, 64 of the fixed long rail 20 includes a track 80, 82 having a generally C-shaped cross-sectional profile with each track 80, 82 having a track bottom wall 80A, 82A, a track outer side wall 60A, 64A, a track top wall 86, 88, and a retaining lip 90, 92 extending downward from the adjacent track top wall 86, 88 and spaced apart from the track outer side wall 60A, 64A. The fixed long rail 20 is a stamped, formed, molded, extruded and/or rolled section of a metal or plastic material and having a length selected based on a specific application. It should be appreciated that the size and shape of the fixed long rail 20 may vary without altering the scope of the invention.

Also shown in FIG. 4, the power rail drive assembly 12 includes an upper channel 94 having a generally inverted U-shaped cross-sectional profile 96, opposing first and second side walls 98, 100, and a top wall 102 extending between the opposing first and second side walls 98, 100. Fixedly attached to the opposing first and second side walls 98, 100 are first and second striker plates 103, 104. Each of the first and second striker plates 103, 104 is a solid piece of metal but for a central opening 105. A striker 106 passes through the central opening 105 in each of the first and second striker plates 103, 104. The striker 106 is fixedly attached to the first and second striker plates 103, 104 to allow for a sturdy connection. It should be appreciated that the size and shape of the upper channel 94 may vary without altering the scope of the invention.

In order to allow for smooth movement of the vehicle seat 18 when latched, an axle 107 extends laterally through a hollow tube 108 extending between the opposing first and second side walls 98, 100 of the upper channel 94, as illustrated in FIG. 4. A wheel 110 is fixedly coupled to each end 107A of the axle 107. While not shown, the wheels 110 can be replaced by rollers and/or glides coupled to the opposing first and second side walls 98, 100. Any number and/or combination of wheels 110, rollers, and/or glides may be used as suitable for an intended application.

Referring to FIG. 1, the latch assembly 32 can be removably latched to the striker 106. The connection and disconnection of the latch assembly 32 with the striker 106 allows the vehicle seat 18 to be attached to or removed from the power rail drive assembly 12. Further included is an opening 112 in the top wall 102 of the power rail drive assembly 12. An extension 114 of the latch assembly 32 descends into the opening 112 of the power rail drive assembly 12 when the latch assembly 32 is being latched to the striker 106. As the extension 114 passes through the opening 112, it comes into contact with first and second wedge plates 116, 117 attached to respective opposing first and second side walls 98, 100 of the upper channel 94, as shown in FIG. 4. The first and second wedge plates 116, 117 help guide and center the latch assembly 32 into position through contact with the extension 114. The first and second wedge plates 116, 117 also create a snug and secure fit with the extension 114 once the latch assembly 32 is fully latched to the striker 106.

Figure 7:
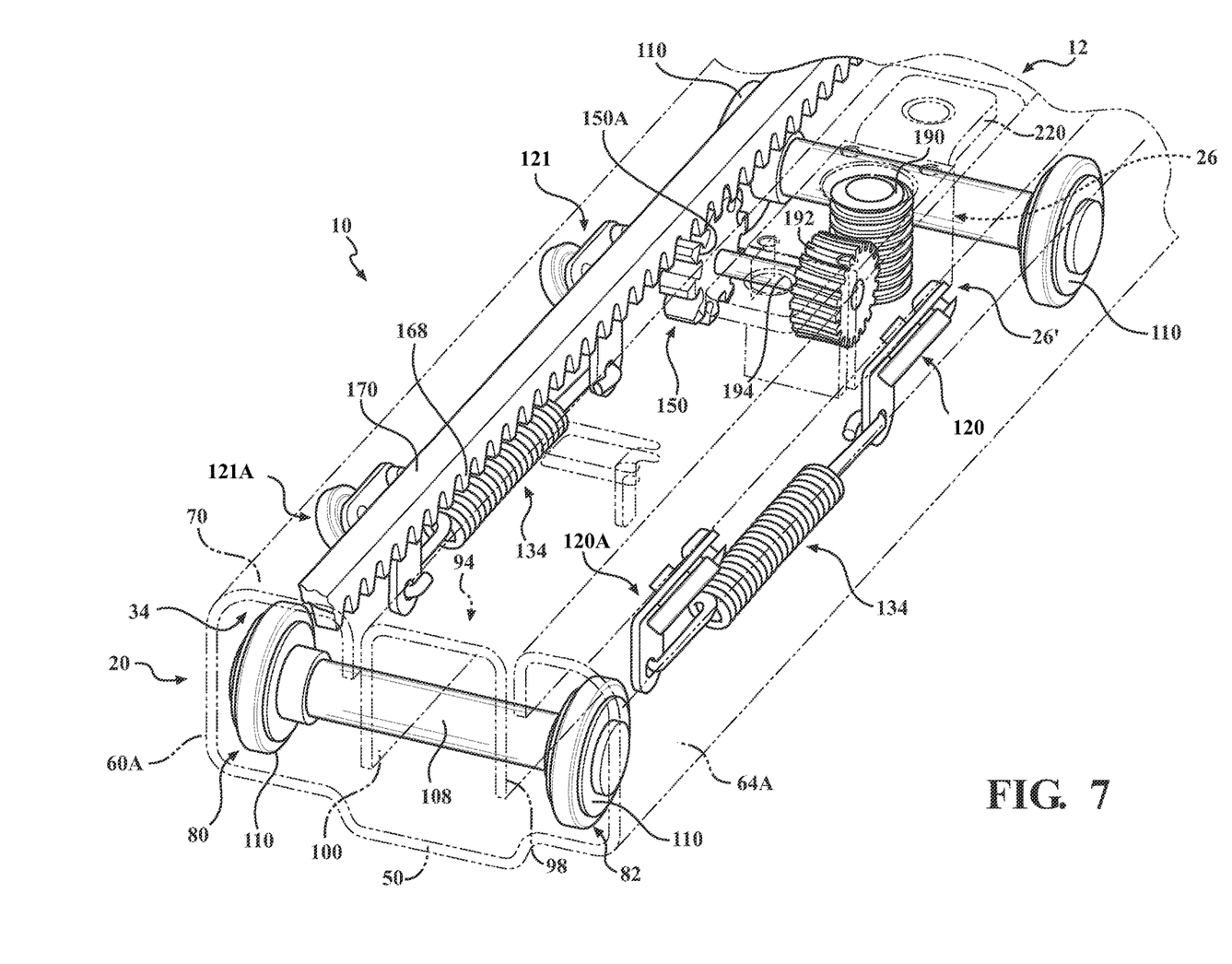
FIG. 7 is a partially transparent perspective view of the long rail assembly of FIG. 1, illustrating a drive wheel of the spring-loaded gearbox assembly meshingly engaged with a gear rack attached to the fixed long rail.

As shown in FIG. 5, the power rail drive assembly 12 optionally has lateral stability rollers 120, 121 rotationally coupled to the opposing first and second side wall 98, 100 of the upper channel 94. The lateral stability rollers 120, 121 absorb fixed long rail 20 variations in one or both of lateral and vertical directions based in part on a selected configuration of the lateral stability rollers 120, 121. An exemplary embodiment of lateral stability rollers 120, 121 is shown in FIG. 6 and includes a roller 124, an upper arm 126, a lower arm 128, and a support stud 130. The roller 124 is rotationally coupled to a pivot 132 attached to the upper arm 126 near an upper end 126A of the upper arm 126. A lower end 126B of the upper arm 126 is rotationally coupled to the support stud 130. Alternatively, the upper arm 126 and the lower arm 128 can be replaced by a single arm if desired. The support stud 130 is fixedly coupled to an adjacent first or second side wall 98, 100 of the upper channel 94. A partially transparent view of the long rail assembly 10 of FIG. 1 is shown in FIG. 7 and illustrates a first pair of lateral stability rollers 120, 120A and an opposing second pair of lateral stability rollers 121, 121A attached to respective first and second side walls 98, 100 of the power rail drive assembly 12. The lateral stability rollers 120, 120A, 121, 121A on each of the opposing first and second side walls 98, 100 of the power rail drive assembly 12 are coupled together through a tension spring 134. The tension spring 134 biases the lateral stability rollers 120, 120A, 121, 121A towards engagement with the fixed long rail 20. It should be appreciated that the lateral stability rollers 120, 120A, 121, 121A and the first and second wedge plates 116, 117 can vary in size, shape, and number, and further can be omitted without altering the scope of the invention.

Referring again to FIG. 2, one embodiment of the long rail assembly 10 includes an upper gearbox 144A fixedly coupled to the vehicle seat 18 and the spring-loaded gearbox assembly 26' fixedly coupled to the power rail drive assembly 12. The upper gearbox 144A includes a drive gear 145 operatively connected to an external drive source. In addition, the upper gearbox 144A is operatively coupled to the spring-loaded gearbox assembly 26' by an auto-centering quick-connection mechanism 147 when the vehicle seat 18 is coupled to the power rail drive assembly 12. Alternatively, the spring-loaded gearbox assembly 26' is operatively coupled to the external drive source by a flex cable, a direct drive shaft, or other known methods. Other embodiments integrate the drive source within the upper channel 94, either via a direct drive connection to the spring-loaded gearbox assembly 26', using additional gears and drive shafts, and/or optionally connecting the spring-loaded gearbox assembly 26' to a drive source using a flex cable.

As shown in FIG. 7, the spring-loaded gearbox assembly 26' is located within the power rail drive assembly 12 and is operatively coupled to a drive wheel 150 located within the fixed long rail 20. The drive wheel 150 is a pinion having gear teeth 150A configured to meshingly engage with gear teeth 168 and/or notches in a gear rack 170 fixedly coupled to the fixed long rail 20. The spring-loaded gearbox assembly 26' having a drive wheel 150 paired with the gear rack 170 is the transmission system for providing the fore-aft motion of the power vehicle seat 18. The spring-loaded gearbox assembly 26' ensures the drive wheel 150 always engages the gear rack 170 during fore-aft adjustment, even when the vehicle seat 18 experiences vibrations from road input. Preferably, the drive wheel 150 is a plastic gear since the drive wheel 150 is not a load-carrying component. While the drive wheel 150 can comprise other materials as desired for an intended application, the plastic drive wheel 150 provides a quiet driving method as the power rail drive assembly 12 travels along the fixed long rail 20. Further, the gear teeth 168 on the gear rack 170 prevent driving slip when the gear teeth 168 meshingly engage with the gear teeth 150A on the drive wheel 150.

Figure 8:
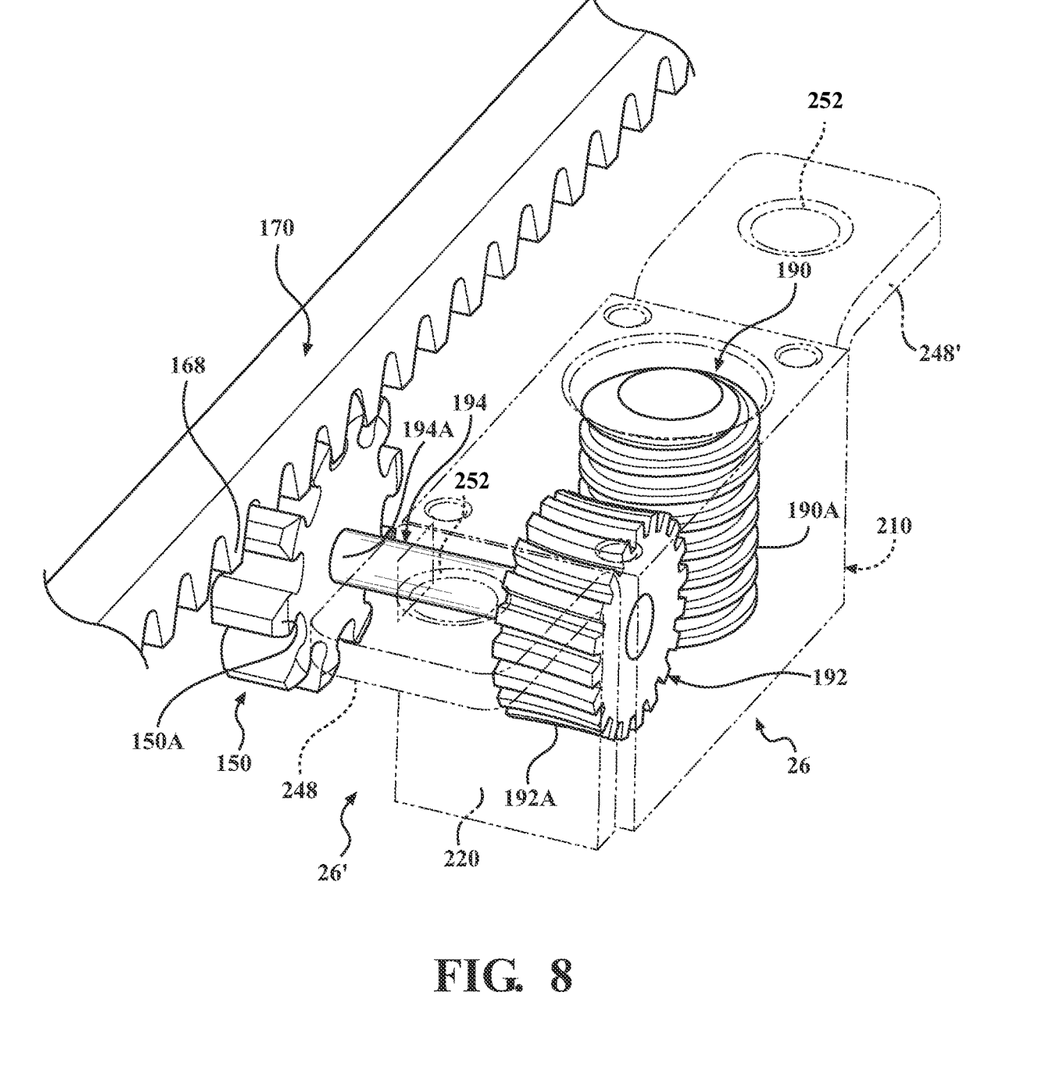
FIG. 8 is a partially transparent perspective view of the spring-loaded gearbox assembly and gear rack of FIG. 7 removed from the long rail assembly.

A partially transparent view of the spring-loaded gearbox assembly 26' and the gear rack 170 removed from the long rail assembly 10 is shown in FIG. 8, illustrating internal components of the spring-loaded gearbox assembly 26'. The spring-loaded gearbox assembly 26' provides the torque needed for rotation of the drive wheel 150. In the embodiment shown in FIG. 2, torque is transferred from the drive gear 145 of the upper gearbox 144A to the drive wheel 150 of the spring-loaded gearbox assembly 26' through the auto-centering quick connection mechanism 147. The structure of the auto-centering quick connection mechanism 147 may vary between different embodiments of the long rail assembly 10 without altering the scope of the invention. Further, in certain embodiments torque is transferred to the spring-loaded gearbox assembly 26' via a flex cable, a direct drive connection, a drive shaft, and the like, as non-limiting examples.

Referring to FIG. 8, the spring-loaded gearbox assembly 26' includes a gearbox 26 having a worm gear 190 meshingly engaged with a worm wheel 192. In the embodiment shown in FIG. 8, the worm gear 190 is configured to be driven by an external drive source. Further, the worm wheel 192 has gear teeth 192A configured to meshingly engage with a curved involute tooth 190A on the worm gear 190. In addition, a drive shaft 194 projects axially from the worm wheel 192 with a distal end 194A of the drive shaft 194 fixedly coupled to the drive wheel 150. Thus, the drive wheel 150 is operatively coupled to the worm gear 190 within the gearbox 26 via the worm wheel 192. While the drive wheel 150 is shown as a spur gear in FIG. 8, other embodiments of the gearbox 26 can include other types of gears including lateral drive wheels, spiral gears, herringbone gears, flexible shafts, worm gears, and the like, without altering the scope of the invention.

Further description of the sliding movement between the power drive rail assembly 12 and the fixed long rail 20 is fully set forth in applicant's co-pending Application No. PCT/US2020/022908, entitled Long Rail Assembly With Internal Power Driving System, filed Mar. 16, 2020, the disclosure of which is hereby incorporated by reference in its entirety.

Figure 9:
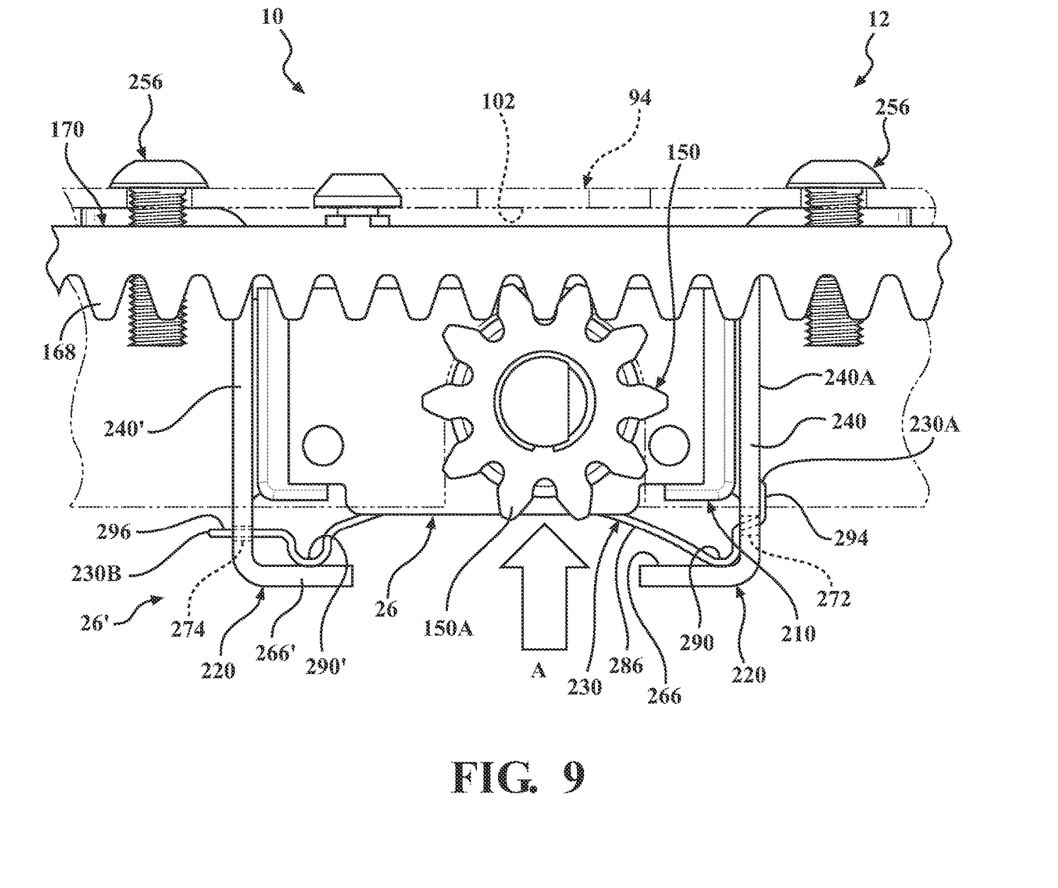
FIG. 9 is a fragmentary view of the spring-loaded gearbox assembly within the long rail assembly of FIG. 1, illustrating engagement between the gear rack and the drive wheel of the spring-loaded gearbox assembly.

The gearbox 26 comprises a gearbox housing 210 that contains and supports the worm gear 190 and the worm wheel 192, as shown in FIG. 8. Referring to FIG. 9, the gearbox housing 210 is supported by a mounting bracket 220 that is fixedly coupled to the upper channel 94. The gearbox housing 210 is configured to be repositionable within the mounting bracket 220 in a generally vertical direction perpendicular to the longitudinal axis of upper channel 94 when the gearbox 26 and the mounting bracket 220 are assembled with the upper channel 94. A spring 230 is positioned between the mounting bracket 220 and the gearbox 26 and biases the gearbox 26 towards the top wall 102 of the upper channel 94, as illustrated by arrow A shown in FIG. 9. When the power rail drive assembly 12 is assembled with the fixed long rail 20, the spring 230 biases the drive wheel 150 towards an engaged position with the gear rack 170, as shown in FIG. 9. While a leaf spring 230 is shown in the Figures, any suitable spring type can be used including compression, extension, spiral, and the like, as non-limiting examples.

Figure 10:
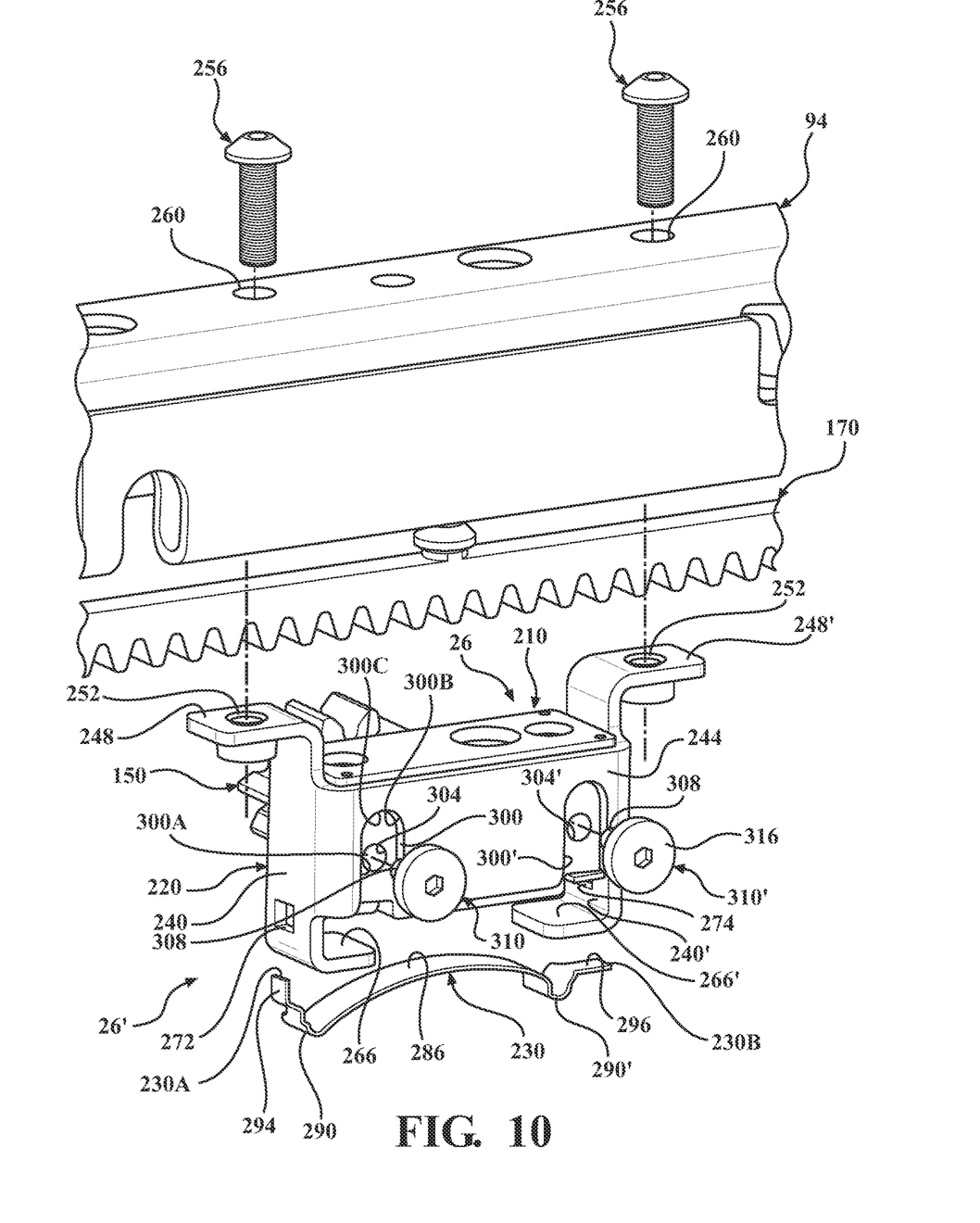
FIG. 10 is a partially exploded view of the spring-loaded gearbox assembly of FIG. 9.

An exploded view of certain components of FIG. 9 is shown in FIG. 10, further illustrating the construction of the spring-loaded gearbox assembly 26'. Referring to FIG. 10, the mounting bracket 220 is a generally U-shaped bracket having opposing first and second end walls 240, 240' and a side wall 244 extending between the opposing first and second end walls 240, 240'. A mounting tab 248, 248' projects at an angle from each of the first and second end walls 240, 240' of the mounting bracket 220. Each of the mounting tabs 248, 248' includes a through hole 252 sized to matingly engage with a fastener 256 when the mounting bracket 220 is fixedly coupled to the upper channel 94. When the mounting bracket 220 is assembled with the upper channel 94, fasteners 256 are inserted through holes 260 in the upper channel 94 and fixedly coupled to the mounting tabs 248, 248'. Other embodiments include alternate means of fixedly coupling the mounting bracket 220 to the upper channel 94, including a tab passing through a slot, a crimped joint, a weld joint, clips, threaded fasteners, rivets, and the like, as non-limiting examples.

In the embodiment shown in FIG. 10, the mounting bracket 220 includes opposing first and second support tabs 266, 266' extending at an angle generally perpendicular from the opposing first and second end walls 240, 240' and generally parallel to the mounting tabs 248, 248'. More specifically, in the embodiment shown in FIG. 10, each of the opposing first and second support tabs 266, 266' extend from the opposing first and second end walls 240, 240' at about a 90° angle. Further, the first end wall 240 includes a first passageway 272 for receiving, supporting and retaining a first end 230A of the spring 230. In addition, the second end wall 240' includes a second passageway 274 for receiving, supporting and retaining a second end 230B of the spring 230.

As shown in FIG. 10, the spring 230 includes an arcuate-shaped portion 286 extending between opposing first and second base portions 290, 290'. Each of the opposing first and second base portions 290, 290' adjoin a respective one of first and second spring tab portions 294, 296. The first and second spring tab portions 294, 296 are adjacent to the respective first and second ends 230A, 230B of the spring 230. Referring to FIG. 9, the first spring tab portion 294 is configured to pass through the first passageway 272 in the first end wall 240 of the mounting bracket 220 and abut an outer surface 240A of the first end wall 240 when the first base portion 290 of the spring 230 abuts the first support tab 266. The first spring tab portion 294 is sized and shaped such that motion of the first spring tab portion 294 is constrained by frictional engagement with the first end wall 240 of the mounting bracket 220. In certain embodiments, the first spring tab portion 294 is interlocked with the first end wall 240 and the first passageway 272 through the first end wall 240. The second spring tab portion 296 is likewise configured to pass through the second passageway 274 in the second end wall 240' of the mounting bracket 220 when the second base portion 290' of the spring 230 abuts the second support tab 266'. However, motion of the second end 230B of the second spring tab portion 296 is unconstrained by the second end wall 240'. As such, the second base portion 290' of the spring 230 is repositionable, or slidable, longitudinally along the second support tab 266' as the compressive force applied to the spring 230 changes.

As shown in FIG. 10, the mounting bracket 220 includes a pair of open-ended slots 300, 300' in the side wall 244 of the mounting bracket 220. The open-ended slots 300, 300' include opposing side walls 300A, 300B and a slot end wall 300C extending between the opposing side walls 300A, 300B. The gearbox housing 210 includes passageways 304, 304' aligned with the open-ended slots 300, 300'.

The passageways 304, 304' are configured to matingly engage with a shaft 308 of a shoulder bolt 310, 310'. Each of the shoulder bolts 310, 310' includes a shoulder 316 extending at an angle from the shaft 308 and configured such that the shoulder 316 cannot pass through the open-ended slot 300, 300' in the mounting bracket 220 when the shaft 308 is fixedly coupled to the gearbox housing 210. The motion of the gearbox 26 is constrained within the mounting bracket 220 by the shoulder bolts 310 protruding from the gearbox housing 210 and through the open-ended slots 300, 300' in the mounting bracket 220. The spring 230 biases the gearbox 26 in the mounting bracket 220 such that the shoulder bolts 310, 310' are biased towards the slot end wall 300C of the open-ended slots 300, 300' when the spring 230, the gearbox 26, the shoulder bolts 310, 310', and mounting bracket 220 are assembled with the upper channel 94.

Figure 11:
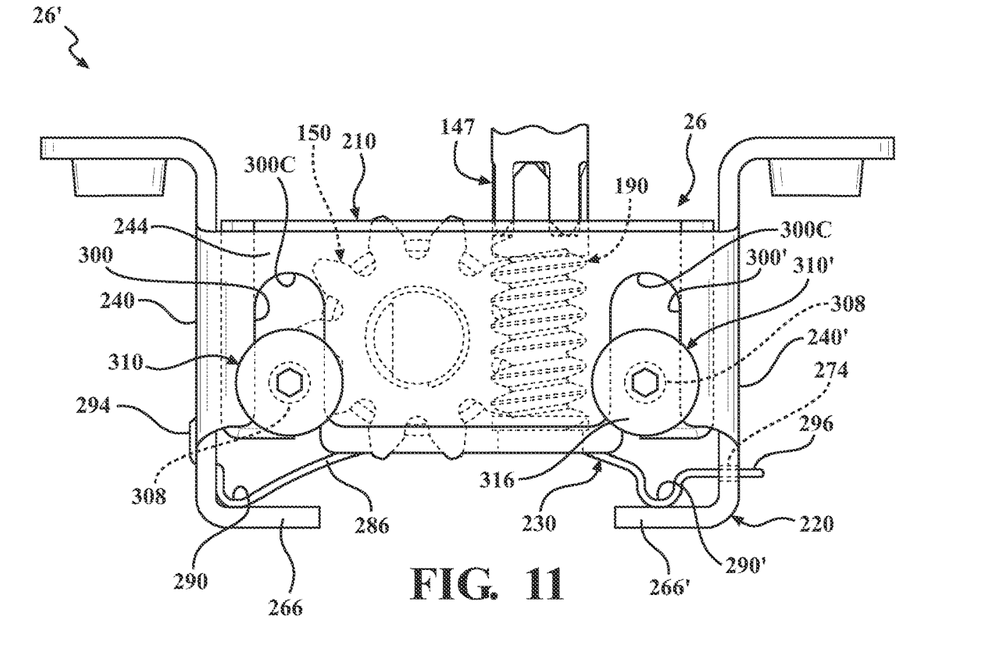
FIG. 11 is a partially transparent side view of the spring-loaded gearbox assembly of FIG. 9, illustrating the gearbox biased away from end walls of open-ended slots in a mounting bracket.
Figure 12:
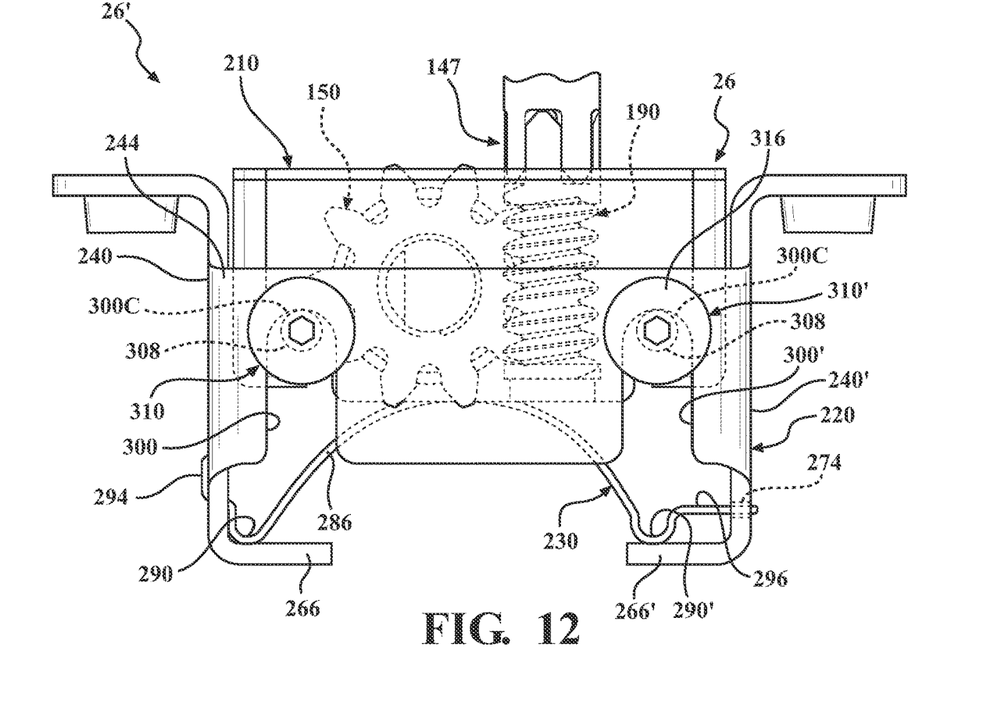
FIG. 12 is a partially transparent side view of the spring-loaded gearbox assembly of FIG. 11, illustrating the gearbox biased towards the end walls of the open-ended slots in the mounting bracket.

In operation, the movement of the gearbox 26 within the mounting bracket 220 is further illustrated in reference to FIGS. 11 and 12. FIG. 11 shows the spring 230 highly compressed by the gearbox 26 with the shoulder bolts 310, 310' spaced apart from the slot end walls 300C of the open-ended slots 300, 300' in the mounting bracket 220. In contrast, FIG. 12 shows the spring 230 extended with the gearbox 26 shifted upward such that the shafts 308 of the shoulder bolts 310, 310' are frictionally engaged with the respective slot end wall 300C of the open-ended slots 300, 300' in the mounting bracket 220.

Comparing FIGS. 11 and 12, the relative position of the second spring tab portion 296 within the second passageway 274 in the second end wall 240' of the mounting bracket 220 changes based on the amount of compressive force on the spring 230. In both FIGS. 11 and 12, the relative position of the first spring tab portion 294 is generally maintained regardless of the amount of compressive force on the spring 230. The relative position of the second spring tab portion 296 changes based on the amount of compressive force on the spring 230, with the second base portion 290' sliding along the second support tab 266' as required to accommodate the change in the shape of the spring 230.

The assembly of the gearbox 26 with the mounting bracket 220, the spring 230, and the shoulder bolts 310, 310' forms the spring-loaded gearbox assembly 26'. When the mounting bracket 220 of the spring-loaded gearbox assembly 26' is fixedly coupled to the upper channel 94 and the upper channel 94 assembled with the fixed long rail 20, the spring-loaded gearbox assembly 26' maintains meshed engagement between the drive wheel 150 and the gear rack 170 since the spring 230 biases the gearbox 26 upwardly towards the gear rack 170. The spring-loaded gearbox assembly 26' compensates for dimensional variation along the fixed long rail 20, within the gear rack 170, within the power rail drive assembly 12, and the like. Therefore, the spring-loaded gearbox assembly 26' in the power rail drive assembly 12 results in a vehicle seat 18 positioning system that is less affected by variation in component dimensions.

One benefit of the spring-loaded gearbox assembly 26' for the long rail assembly 10 is the spring-loaded gearbox assembly 26' maintains engagement between the drive wheel 150 of the power rail drive assembly 12 and the gear rack 170 within the fixed long rail 20 even when the drive wheel 150 is subjected to vibrations from road input. A second benefit is the spring-loaded gearbox assembly 26' compensates for variation in dimensions of the fixed long rail 20. A third benefit is the spring-loaded gearbox assembly 26' provides torque to the drive wheel 150 as well as biasing the drive wheel 150 towards an engaged position with the gear rack 170.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A long rail assembly for providing sliding movement of a vehicle seat within a vehicle, said long rail assembly comprising:
   a fixed long rail extending longitudinally between opposing first and second ends of said fixed long rail and defining an interior cavity therebetween; and
   a power rail drive assembly extending longitudinally between opposing first and second ends of said power rail drive assembly, said power rail drive assembly slidably coupled to said fixed long rail for providing said sliding movement of the vehicle seat along said fixed long rail, said power rail drive assembly comprising an upper channel, a spring-loaded gearbox assembly fixedly coupled to said upper channel, and a drive wheel fixedly coupled to a drive shaft projecting from said spring-loaded gearbox assembly and rotatable by said spring-loaded gearbox assembly for transposing said power rail drive assembly along said fixed long rail;
   wherein:
   said spring-loaded gearbox assembly comprises a mounting bracket fixedly coupled to said upper channel, a gearbox repositionable within said mounting bracket, and a spring biasing said gearbox within said mounting bracket such that said drive wheel is meshingly engaged with said fixed long rail;

said mounting bracket includes a slot having opposing side walls and a slot end wall extending between side walls; and said spring-loaded gearbox assembly includes a shoulder bolt having a shaft and a shoulder projecting from said shaft, said shaft of said shoulder bolt fixedly coupled to a gearbox housing and passing through said slot such that said mounting bracket is spaced between said gearbox housing said shoulder of said shoulder bolt.

2. The long rail assembly as set forth in claim 1, wherein:
said gearbox comprises a worm gear meshingly engaged with a worm wheel, said worm gear and said worm wheel supported and contained within said gearbox housing; and said drive shaft projects axially from said worm wheel and passes through said gearbox housing.

3. The long rail assembly as set forth in claim 2, wherein motion of said gearbox within said mounting bracket is constrained by the motion of said shaft of said shoulder bolt along said slot in said mounting bracket.

4. The long rail assembly as set forth in claim 3, wherein said spring biases said gearbox in said mounting bracket such that said shaft of said shoulder bolt is biased towards said slot end wall of said slot.

5. The long rail assembly as set forth in claim 4, wherein said worm gear is operatively coupled to an external drive source.

6. The long rail assembly as set forth in claim 5, wherein said spring has a first spring tab portion interlocked with said mounting bracket such that said first spring tab portion is constrained.

7. The long rail assembly as set forth in claim 6, wherein:
said spring is a leaf spring having said first spring tab portion, a first base portion, an arcuate-shaped portion, a second base portion, and a second spring tab portion, said first base portion being spaced apart from said second base portion by said arcuate-shaped portion, said first spring tab portion adjacent a first end of said spring and adjoining said first base portion, and said second spring tab portion adjacent a second end of said spring and adjoining said second base portion.

8. The long rail assembly as set forth in claim 7, wherein:
said mounting bracket comprises opposing first and second end walls and a side wall extending between said opposing first and second end walls;

said first end wall including a first passageway;

said second end wall including a second passageway;

said first spring tab portion of said spring passing through said first passageway in said first end wall; and said second spring tab portion of said spring passing through said second passageway in said second end wall.

9. The long rail assembly as set forth in claim 8, wherein:
said mounting bracket includes a first support tab and a second support tab;

said first base portion of said spring being frictionally engaged with said first support tab; and said second base portion of said spring being frictionally engaged with said second support tab.

10. The long rail assembly as set forth in claim 9, wherein:
a gear rack is fixedly coupled to said fixed long rail and extends in a longitudinal direction of said fixed long rail; and said drive wheel is configured to meshingly engage with said gear rack.

11. The long rail assembly as set forth in claim 10, wherein said spring-loaded gearbox assembly maintains engagement between said drive wheel and said gear rack as said drive wheel travels along said gear rack.

12. The long rail assembly as set forth in claim 11, wherein said spring biases said gearbox towards an engaged position wherein said drive wheel is engaged with said gear rack.

13. The long rail assembly as set forth in claim 12, wherein said slot is an open-ended slot.

\* \* \* \* \*